United States Patent [19]

Holko

[11] 4,333,670

[45] Jun. 8, 1982

[54] STEPPED TRANSITION JOINT

[75] Inventor: Kenneth H. Holko, San Diego, Calif.

[73] Assignee: General Atomic Company, San Diego, Calif.

[21] Appl. No.: 146,491

[22] Filed: May 5, 1980

[51] Int. Cl.³ .............................................. F16L 13/02
[52] U.S. Cl. .................................... 285/173; 228/112; 228/175; 228/263 D; 285/286; 285/DIG. 6
[58] Field of Search ................. 285/173, 329, DIG. 6, 285/286; 228/112, 263 D, 175

[56] References Cited

U.S. PATENT DOCUMENTS

| | | | |
|---|---|---|---|
| 1,613,461 | 1/1927 | Johnson | 285/286 X |
| 2,759,249 | 8/1956 | Eberle | 228/263 D X |
| 2,763,923 | 9/1956 | Webb | |
| 2,770,030 | 11/1956 | Carpenter | |
| 3,052,016 | 9/1962 | Zimmer | |
| 3,123,447 | 3/1964 | Zimmer | |
| 3,175,284 | 3/1965 | Cotovsky | 285/286 X |
| 3,284,174 | 11/1966 | Zimmer | |
| 3,425,718 | 2/1969 | Shaw, Jr. | 285/286 X |
| 4,010,965 | 3/1977 | Izuma et al. | 285/173 |
| 4,247,036 | 1/1981 | Salesse et al. | 228/263 E X |

*Primary Examiner*—Thomas F. Callaghan

*Attorney, Agent, or Firm*—Fitch, Even, Tabin, Flannery & Welsh

[57] ABSTRACT

A transition joint is disclosed for joining together tubular pieces formed respectively from a low alloy or carbon steel and a high temperature alloy composition including approximately 20% chromium, the transition joint including a plurality of tubular parts welded together and formed from standard code-approved materials of selected composition with a maximum variation in chromium content of approximately 2-5% between adjacent parts when the chromium content is below approximately 10% and a maximum chromium content variation of approximately 3-7% between adjacent transition parts when the chromium content of either part is above approximately 10% in either part, the transition parts being joined by friction welding and/or fusion welding and/or formed entirely by fusion welding deposition. The transition parts are also graded as to thermal expansion and strength characteristics, and the transition parts at opposite ends of the transition joint are preferably formed from low alloy or carbon steel and high temperature alloy composition respectively to facilitate in situ installation of the transition joint.

12 Claims, 2 Drawing Figures

STEPPED TRANSITION JOINT

BACKGROUND OF THE INVENTION

The present invention relates to high temperature transition joints and more particularly to such a joint adapted for interconnection between a first tubular part formed from a low alloy or carbon steel and a second tubular part formed from a high temperature alloy containing approximately 20% chromium.

In many high temperature applications, it is necessary to join together tubular parts of substantially different characteristics. For example, such applications arise in fossil-fired boiler construction and in nuclear power stations. In such power stations, high temperature joints are commonly required in various heat exchanger components such as boilers, steam generators, intermediate heat exchangers and recuperators, particularly in high temperature gas-cooled reactors, etc. Similar applications arise in other industries, such as petro-chemical equipment and chemical processing plants having substantial requirements for heat exchangers, steam lines and the like.

In all of these applications, it is usually necessary to form large numbers of tubular interconnections between materials of substantially different characteristics. Usually, one end of the tubular interconnection is formed from a high temperature alloy particularly suited for withstanding high temperature environments. At the same time, it is necessary for the interconnection or transition joint to withstand similar severe operating conditions of temperature, etc., over extended periods of time.

Under conditions of the type described above, the different types of materials to be interconnected by the transition joint exhibit substantially different physical characteristics making it difficult to maintain continuity throughout the transition joint. For example, the existence of very different thermal expansion rates on opposite sides of any given bond within such a high temperature joint tends to produce particularly severe stresses tending to cause cracking or total disruption of the bond. Other factors also exist within such transition joints which further interfere with the maintenance of an effective continuous transition joint or interconnection.

In many such high temperature applications, the different tubular materials to be interconnected consist of a low alloy steel or carbon steel on the one hand and a high temperature alloy composition on the other hand adapted to best withstand the severe high temperature conditions. Such compositions are particularly contemplated by the present invention and the high temperature alloy composition is further contemplated as containing approximately 16–20% chromium or more. Examples of such high temperature alloys include wrought or cast austenitic steels, such as ASTM or ASME Type 321H stainless or 304H stainless steel, and wrought or cast nickel base alloys. On the other hand, the low alloy, carbon containing steels may include ASTM or ASME SA213 Grade T22 steel containing for example 2¼% chromium, 1% molybdenum and 0.1% carbon, Grade T-11 steel containing approximately 1¼% chromium, ½% molybdenum and 0.1% carbon as well as other similar low alloy, carbon containing steels. The carbon steel may include ASTM or ASME SA-106, Grade A, B or C containing up to 0.35% carbon.

Substantial efforts have been expended in the past to develop effective transition joints for such applications. One such approach has been the formation of the joint with continuously changing chemical composition along the length of the joint, for example, by electroslag techniques, with one end of the joint being connected to one tubular piece and the other end of the joint joined to the other tubular piece of substantially different composition and characteristics. Many different types of material, such as powder metallurgy components and the like, have also been employed to form the transition joint. Heat treatment has also been employed both prior to and following formation of the transition joint in order to better condition the transition joint and interconnecting bonds to withstand severe operating conditions of the type referred to above. One particular problem encountered in such transition joints arises from the presence of low carbon or ferritic steel on one side of the joint and a high temperature alloy including a high chromium content on the other side of the joint. In such a situation, it has been found that the high chromium content exhibits a high affinity for carbon on the other side of the joint. Such a condition tends to cause migration of carbon across the bond from the low alloy steel, thereby producing a carbon-depleted zone immediately adjacent the bond which is particularly susceptible to disruption in the event of high thermal or mechanical stresses for example.

The prior art has been clearly aware of this particular problem, as noted for example by Zimmer U.S. Pat. No. 3,052,016. One prior art solution to this problem has been the use of a high nickel content in the part welded to the low alloy ferritic steel on the theory that the nickel would impede or limit carbon migration even in the presence of high chromium content. However, it has since been found that the use of high nickel does not prevent carbon migration over substantial periods of time. Thus, there remains a problem of providing an effective transition joint for such applications. Even with developments and improvements in the area of transition joints as discussed above, high failure rates have been and are being experienced with such transition joints exposed to severe operating conditions. Thus there has been found to remain a need for an improved transition joint to form an interconnection between low alloy or carbon steel tube or pipe and high temperature alloy tube or pipe including a high chromium percentage.

SUMMARY OF THE INVENTION

It is therefore an object of the invention to provide a transition joint suitable for use as an interconnection between low alloy or carbon steel tubing and high temperature alloy tubing containing a high chromium percentage over long periods of operation.

It has been found that an improved transition joint may be constructed in accordance with the present invention by forming the transition joint from a plurality of transition parts each having a selected composition. Preferably, the compositions for adjacent transition parts are selected so that when the chromium content of both parts is below 10%, the maximum variation or differential between chromium content in the two parts is maintained at approximately 2–5%. Similarly, when the chromium content of either part is greater than 10%, the maximum variation of differential in chromium content between the two parts is maintained at approximately 3–7%. More preferably, the maximum chromium differential for parts both having a chromium content below 10% is preferably maintained in the range of approximately 2–3% and even more preferably below a maximum of 2 or 2½%. At the same time, where one of the parts has a chromium content in excess of 10%, the maximum chromium differential is preferably maintained in the range of approximately 3–5% and even more preferably in the range of about 3%.

It will be apparent from the following description that the lower chromium differential is best employed in applications where particularly severe operating conditions are to be encountered. For example, such severe operating conditions include excessively high temperatures and high mechanical stress where joint continuity is to be maintained over long periods of operation. On the other hand, in less severe operating conditions where it may be desirable or necessary to provide greater economy in construction of the transition joint, the higher chromium differentials may be employed in order to reduce the number of parts within the transition joint. However, in either event, the stepped or graded regulation of chromium content across the transition joint in accordance with the present invention produces a lower driving force for carbon migration and results in reduced carbon mobility, thus minimizing the tendency to produce a carbon-depleted zone as described above.

The invention also contemplates that the composition of adjacent transition parts essentially be selected in order to maintain a minimal stepped relation between the thermal expansion rate between adjacent parts in order to further minimize harmful effects of differential thermal expansion. The strength or allowable stress of the various transition parts may also be taken into consideration in selecting the characteristics or compositions of adjacent transition parts. It is important that large mismatches in strength be taken at the stronger interfaces, i.e., between materials of higher chromium content.

The present invention also preferably contemplates that all of the materials employed within the transition joint, both the transition parts themselves as well as filler material used to interconnect the parts by fusion welding, be formed from standard code-approved materials having known capabilities to resist such high temperature environments. It has been found that such standard materials may be employed while maintaining the stepped relation of both chromium composition and thermal expansion characteristics as referred to above.

Finally, it is particularly contemplated that different types of weld joints be employed within the transition joint and that effective pre-weld heat treatment as well as post-weld heat treatment be employed where necessary in order to achieve maximum strength and preferred microstructure within the various transition parts. For example, in forming certain bonds within the transition joint, such as between adjacent transition parts having relatively large variations in chromium content, thermal expansion or the like, friction welding is preferably employed because of its ability to form a generally solid state interface formed perpendicularly to the longitudinal axis of the transition joint with minimal drifting or blending of different composition materials across the interface. Both of these features have been found to be particularly important in adapting such a joint for resisting high stresses of either a thermal or mechanical type. On the other hand, fusion welding may also be preferably employed in formation of other bonds. In any event, the filler material deposited by the fusion welding process is also preferably selected as a standard, code approved material to assure its effectiveness over long periods of operation. Also, when filler material is deposited by fusion welding, the linear dimension of the filler material should be such to provide an annular zone generally characterized by the nominal composition for the filler material itself. In this manner, the filler material may form an additional transition part or step throughout the transition joint. It is further contemplated that the fusion welding deposition may be continued in a technique commonly referred to as "buttering" where the filler material is deposited over a substantial axial length of, for example, ¼–½ inch to form a transition part which may then be interconnected to additional transition parts or even to the long run tubular parts to be interconnected by the transition joint, for example, by fusion welding or even by friction welding. It is noted that the axial length of any transition part may be considerably longer in order to satisfy the requirements of some stress analyses. It is also to be noted, in connection with the present invention, that the term "friction welding" is also contemplated to include inertia welding, radial friction welding and orbital friction welding.

Finally, it is preferably contemplated according to the present invention that the transition parts arranged at opposite ends of the transition joint be formed respectively from a low alloy or carbon steel and from a high alloy composition including a high chromium content in order to best adapt the preformed transition joint for in situ connection to long run tubular pieces similarly formed from low alloy, carbon containing steel and a high alloy composition including high chromium content.

Additional modifications and variations according to the present invention are made apparent in the following description having reference to the accompanying drawings and to Tables I and II set forth below which illustrate specific examples of transition joints formed in accordance with the present invention.

DESCRIPTION OF THE PREFERRED EXAMPLES OF THE INVENTION

It will be apparent that a large number of transition joints may be formed in accordance with the present invention having stepped variations in composition and other characteristics such as thermal expansion while at the same time employing different types of welding techniques either to interconnect adjacent transition parts or even to form certain of the transition parts. It will also be apparent that standard, code-approved materials may be employed throughout the length of such a transition joint in order to better assure suitability of the entire transition joint for effectively resisting severe operating conditions over long periods of time. In this regard, it is to be noted that the term "standard, code-approved materials" contemplates the ASME (American Society of Mechanical Engineers) boiler and pressure vessel code and the ASTM (American Society for Testing Materials) code includes standards or requirements both for free formed tubular parts as well as for filler materials in the form of consumable electrodes to be deposited by fusion welding techniques.

Figure 1:
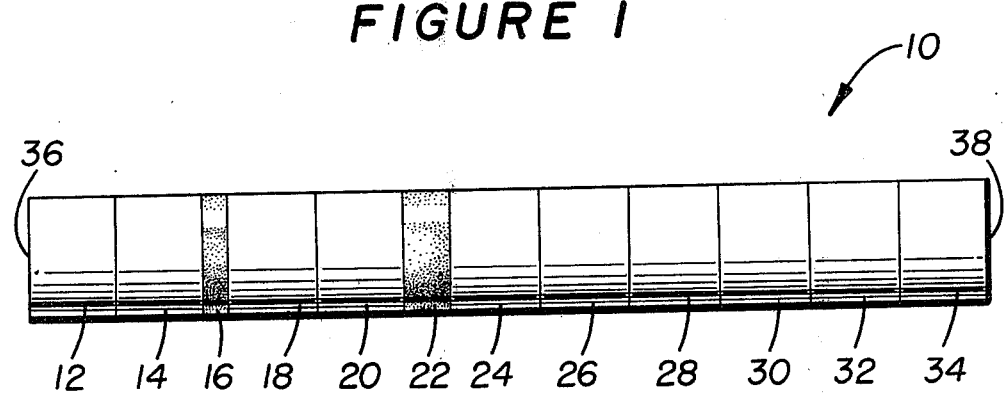
FIG. 1 is a view of one example of a transition joint constructed in accordance with the present invention.
Figure 2:
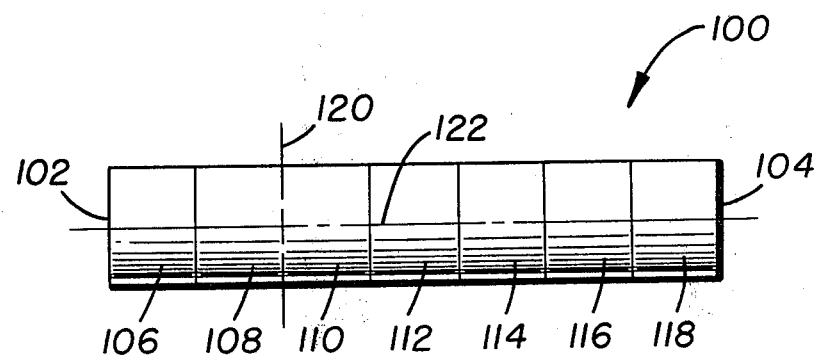
FIG. 2 is similarly a view of another example of a transition joint constructed in accordance with the present invention.

Before proceeding with a detailed description of the exemplary transition joints illustrated in FIGS. 1 and 2, it is noted that Table I set forth below provides a sequential arrangement of the material types throughout the two transition joints. Table II defines both the material composition and other characteristics for each of the material types included in Table I. It is also to be noted from Table II that each of the materials employed in the two transition joints of FIGS. 1 and 2 are formed from standard, code-approved materials. Further, it will be apparent that most if not all of these compositions are also available in the form of filler materials, for example, as consumable electrodes, so that any of the materials may be used in fusion welding to interconnect other transition parts or to even form an entire transition part by fusion deposition or buttering.

TABLE I

MATERIAL COMBINATIONS FOR EXEMPLARY JOINTS

| Corresponding Figure | Serial Arrangement of Material Types |
|---|---|
| 1 | T-22/T21/T-5/T-7/T-9/409/410/429/430/600/800H/304H (12) (14) (16) (18) (20) (22) (24) (26) (28) (30) (32) (34) |
| 2 | T-22/T-5/T-9/410/600/800H/304H (106)(108)(110)(112)(114)(116)(118) |

TABLE II

TRANSISTION JOINT MATERIALS

| GRADE OR TYPE | SPECIFICATION | NOMINAL COMPOSITION (percent by wgt) | MEAN COEFFICIENT OF THERMAL EXPANSION ($\alpha$)TO 1100° F.,in/in °F. | MAX. ALLOWABLE STRESS (KSI) | |
|---|---|---|---|---|---|
| | | | | 1050° F. | 1100° F. |
| T-22 | SA213 | 2¼Cr—1Mo—0.15C | 8.0 | 5.8 | 4.2 |
| T-21 | SA213 | 3Cr—0.9Mo—0.15C | 8.0 | 5.5 | 4.0 |
| T-5 | SA213 | 5Cr—½Mo—0.15C | 7.0 | 4.2 | 3.1 |
| T-7 | SA213 | 7Cr—½Mo—0.15C | 7.0 | 3.5 | 2.5 |
| T-9 | SA213 | 9Cr—1Mo—0.15C | 7.0 | 5.5 | 3.3 |
| 409* | SA268 | 11Cr—0.75Ti—0.08C | — | (9.4 at 800° F.) (cc 1723) | |
| 410 | SA268 | 12.5Cr—0.15C | 6.4 | 4.4 | 2.9 |
| 429 | SA268 | 15Cr—0.12C | — | 4.5 | 3.2 |
| 430 | SA268 | 17Cr—0.12C | 6.6 | 4.5 | 3.2 |
| 600 | SB167 | 16Cr—72Ni—8Fe—0.15C | 8.4 | 4.5 | 3.0 |
| 800H | SB163 | 21Cr—32Ni—46Fe—0.6Ti—0.1C | 9.4 | 13.7 | 13.5 |
| 304H | SA213 | 18Cr—8Ni—0.08C | 10.4 | 12.2 | 9.8 |

*welded tubing

Referring now to the drawings and particularly to FIG. 1, a first exemplary transition joint is indicated at 10 and includes a relatively large number of transition parts respectively indicated at 12-34. The opposite ends of the transition joint are respectively indicated at 36 and 38. Each adjacent pair of transition parts within the joint 10 are interconnected by various types of welding techniques in accordance with the preceding description. For example, joints between various of the transition parts in FIG. 1 could be formed either by friction welding or fusion welding. However the transition joint of FIG. 1 is formed from a substantial number of transition joints having the preferred relatively low maximum differential in chromium content and other characteristics in order to best adapt the joint for severe operating conditions. The transition part 16 is fusion weld deposited from a consumable electrode as filler material between the transition parts 14 and 18. In this case the Grade T-5 composition shown in Table II is weld deposited with a SFA-5.4 E502 covered electrode and/or a SFA-5.9 ER502 base electrode by any of a number of available welding processes. The axial dimension of the part 16 is at least sufficient to assure an annular band having the nominal composition percentages for that part and may be even longer to satisfy stress analysis requirements. Similarly, the transition part 22 is also formed by weld deposition or buttering techniques and having a generally substantial axial length within the transition joint. It is also to be noted that filler material, either standard, code-approved material or otherwise, could be substituted for the standard tubular transition parts otherwise appearing throughout the transition joint. Thus, substantial lengths of the transition joint could be formed in a fusion welding process.

The transition parts 12 and 34 arranged at opposite ends of the transition joint 10 are preferably formed from substantially the same material as the long run tubular materials to which they are to be connected. For example, the transition part 12 is preferably formed from a type T-22 low alloy, carbon containing steel having a nominal composition of 2¼% chromium, 1% molybdenum and 0.15% carbon, balance essentially iron, similar to a long run tube to be joined together by the transition joint. Thus the composition of the transition part 12 is particularly adapted for in situ bonding. Similarly, the transition part 34 at the other end of the joint 10 is preferably formed from type 304H high temperature alloy steel having a high chromium content of 18% and also including 8% nickel and 0.08% carbon, remainder essentially steel. Here again, such a material is also employed as a long run tubing to be joined with the other end of the transition joint. Thus, the transition part 34 is also particularly adapted for in situ bonding to the same material. However, it is to be further noted that the transition part 32 is formed from type 800H high temperature alloy steel also having a high chromium content. It would also be possible to join this material to the long run steel composition noted above by conventional welding techniques.

Referring now to FIG. 2, yet another example of a transition joint constructed in accordance with the present invention is indicated at 100 having opposite ends 102 and 104 while being formed from a plurality of transition parts respectively indicated at 106-118. It may be seen that the transition joint 100 of FIG. 2 is formed from a lesser number of transition parts than the joint 10 of FIG. 1. Thus, the transition joint 100 may be considered more economical to produce or manufacture while being better suited for use in possibly less severe operating conditions. For example, the chromium differential between adjacent transition parts 108 and 110 varies from 5% to 9% chromium. Thus, in further accordance with the present invention, the transition parts 108 and 110 are preferably interconnected or joined together by means of friction welding in order to form an interface 120 which is exactly perpendicular to a longitudinal axis 122 for the joint 100. Otherwise, the bonds between adjacent transition parts may be formed by fusion welding, by friction welding or even by weld deposition of filler material as described in greater detail above. Here again, the end transition parts 106 and 118 are respectively formed from a low alloy, carbon containing steel and a high temperature alloy including high chromium content in further accordance with the present invention.

Various modifications and adaptations of the present invention will be apparent from the preceding description. Accordingly, the scope of the present invention is defined only by the following appended claims.

What is claimed is:

1. A transition joint which must withstand severe conditions in high temperature environments and useful for bonding together tubular pieces formed respectively from a low alloy or carbon steel and a high temperature alloy having a high chromium content of approximately 18%, the low alloy steel and high temperature alloy tubular pieces also having substantially different characteristics such as thermal expansion coefficients, strength and the like, said transition joint comprising a plurality of tubular transition parts aligned along a common longitudinal axis and welded together, a first adjacent pair of transition parts each having chromium contents less than 10 percent being characterized by a maximum chromium differential between the parts of approximately 2–5%, a further adjacent transition part having a chromium content greater than 10 percent and a maximum chromium differential in the range of approximately 3–7% between adjacent transition parts, said tubular transition parts of the lowest chromium content having end faces perpendicular to said longitudinal axis and extending across the full wall thickness thereof, some of the transition parts being selected from standard ASTM code approved materials, each of said transition parts having throughout its length substantially the same thermal expansion coefficients and composition of elements, the transition parts at opposite ends of the transition joint having similar chromium percentages selected in accordance with the tubular pieces to which they are to be joined, the transition parts also being selected to provide a stepped relation of physical characteristics including thermal expansion coefficients, said chromium percentages being graded to reduce carbon migration across an interface between adjacent end faces.

2. The transition joint of claim 1 wherein adjacent transition parts are joined by friction welding and/or fusion welding and/or where the transition parts are formed by fusion weld deposition.

3. The transition joint of claim 2 wherein the transition parts formed by fusion weld deposition are formed with a sufficient axial length in order to assure an annular band of composition corresponding to the nominal composition for that transition part and/or to satisfy stress analysis requirements.

4. The transition joint of claim 2 wherein friction welding is employed to form a friction welded interface between adjacent transition parts of relatively greater chromium differential, the interface being perpendicular to the longitudinal axis for the transition joint and being characterized by the absence of gross blending or drifting of different composition materials across the interface.

5. The transition joint of claim 1 wherein one or more of the transition parts are formed by fusion weld deposition, each such transition part being formed by fusion weld deposition having an axial length sufficient to insure presence of an annular band of composition corresponding to the nominal composition for that transition part and/or to satisfy stress analysis requirements.

6. The transition joint of claim 1 wherein one or more pairs of adjacent transition parts are interconnected by friction welding in order to form an interface therebetween which is perpendicular to a longitudinal axis for the transition joint and which is further characterized by the absence of gross blending or drifting of compositions across the interface.

7. The transition joint of claim 1 wherein the transition parts arranged at opposite ends of the transition joint are formed respectively from a low alloy, carbon containing steel or a carbon steel and a high temperature alloy having a high chromium content in order to facilitate in situ bonding to long run pieces of similar composition.

8. The transition joint of claim 1 wherein the chromium differential between adjacent transition parts both having a chromium percentage less than 10 is maintained at approximately 2–3%.

9. The transition joint of claim 8 wherein said maximum differential for adjacent transition parts each having a chromium content of less than 10% is about 2%.

10. The transition joint of claim 8 wherein the maximum chromium differential for adjacent transition parts is maintained at approximately 3–4% where one of the adjacent parts has a chromium content greater than 10% in order to better adapt the transition joint for withstanding severe operating conditions over long periods of time.

11. The transition joint of claim 1 wherein said maximum differential for adjacent transition parts each having a chromium content of less than 10% is about 2%.

12. The transition joint of claim 11 wherein the maximum chromium differential for adjacent transition parts is maintained at approximately 3–4% where one of the adjacent parts has a chromium content greater than 10% in order to better adapt the transition joint for withstanding severe operating conditions over long periods of time.

* * * * *